US009628490B2

(12) United States Patent
O'Sullivan et al.

(10) Patent No.: US 9,628,490 B2
(45) Date of Patent: Apr. 18, 2017

(54) TRUSTED CONTACT NAME VALIDATION

(75) Inventors: Patrick O'Sullivan, Ballsbridge (IE); James P. Galvin, Jr., Oak Ridge, NC (US)

(73) Assignee: International Business Machines Corporation, Armonk, NY (US)

( * ) Notice: Subject to any disclaimer, the term of this patent is extended or adjusted under 35 U.S.C. 154(b) by 1867 days.

(21) Appl. No.: 11/563,336

(22) Filed: Nov. 27, 2006

(65) Prior Publication Data

US 2008/0126482 A1    May 29, 2008

(51) Int. Cl.
*H04L 12/58*    (2006.01)
*H04L 29/06*    (2006.01)

(52) U.S. Cl.
CPC .......... *H04L 63/101* (2013.01); *H04L 12/581* (2013.01); *H04L 51/04* (2013.01); *H04L 63/126* (2013.01)

(58) Field of Classification Search
CPC ..... H04L 12/581; H04L 51/04; H04L 63/101; H04L 63/126
USPC .................. 709/227–229, 204–207; 455/466
See application file for complete search history.

(56) References Cited

U.S. PATENT DOCUMENTS

| | | | |
|---|---|---|---|
| 6,260,148 B1 * | 7/2001 | Aggarwal et al. ............... 726/14 |
| 6,366,962 B1 * | 4/2002 | Teibel ............................. 709/245 |
| 6,480,885 B1 | 11/2002 | Olivier | |
| 6,701,348 B2 * | 3/2004 | Sommerer ..................... 709/206 |
| 6,941,345 B1 * | 9/2005 | Kapil et al. .................... 709/206 |
| 6,993,564 B2 | 1/2006 | Whitten, II | |
| 7,007,068 B2 * | 2/2006 | Morkel .......................... 709/206 |
| 7,490,076 B2 * | 2/2009 | Mu ......................... H04L 51/04 |
| 7,535,905 B2 * | 5/2009 | Narayanan ............ H04L 63/126 370/392 |
| 7,899,867 B1 * | 3/2011 | Sherstinsky et al. ......... 709/206 |
| 8,010,793 B2 * | 8/2011 | Hoshino ........... H04L 29/12009 713/165 |
| 2003/0005058 A1 | 1/2003 | Sorotzkin | |
| 2003/0135569 A1 * | 7/2003 | Khakoo et al. ................ 709/206 |
| 2004/0059786 A1 * | 3/2004 | Caughey ........................ 709/206 |
| 2004/0171396 A1 * | 9/2004 | Carey et al. ................... 455/466 |
| 2004/0193722 A1 * | 9/2004 | Donovan ....................... 709/230 |

(Continued)

FOREIGN PATENT DOCUMENTS

WO    2004046948    6/2004

*Primary Examiner* — Parth Patel
*Assistant Examiner* — Kai Chang
(74) *Attorney, Agent, or Firm* — Steven M. Greenberg, Esq.; CRGO Law

(57) ABSTRACT

Embodiments of the present invention address deficiencies of the art in respect to validating a specified identity for a participant to a chat session and provide a novel and non-obvious method, system and computer program product for trusted contact name validation for an instant messaging session. In one embodiment of the invention, an instant messaging contact name validation method can be provided. The method can include establishing a trusted relationship among at least two instant messaging servers in a trusted community of instant messaging servers, receiving a request to add a specified contact to a list of instant messaging contacts in association within one of the instant messaging servers in the trusted community of instant messaging servers, and validating the specified contact with another of the instant messaging servers in the trusted community of instant messaging servers.

18 Claims, 2 Drawing Sheets

(56) References Cited

U.S. PATENT DOCUMENTS

| | | | |
|---|---|---|---|
| 2004/0248597 A1* | 12/2004 | Mathis | 455/466 |
| 2005/0240428 A1* | 10/2005 | Gabrick | G06Q 50/184 |
| | | | 705/310 |
| 2006/0018445 A1 | 1/2006 | Mittal | |
| 2006/0059123 A1* | 3/2006 | Klein | G06Q 10/083 |
| 2007/0061405 A1* | 3/2007 | Keohane et al. | 709/207 |
| 2007/0083675 A1* | 4/2007 | Vemulapelli et al. | 709/246 |
| 2007/0143408 A1* | 6/2007 | Daigle | H04L 12/581 |
| | | | 709/206 |
| 2007/0288575 A1* | 12/2007 | Gillum et al. | 709/206 |

\* cited by examiner

TRUSTED CONTACT NAME VALIDATION

BACKGROUND OF THE INVENTION

Field of the Invention

The present invention relates to the field of messaging systems including persistent chats and instant messaging, and more particularly to the validation of an contact name in an instant messaging system.

Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In a real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

In a conventional instant messaging session, which can include not only computer-to-computer instant messaging conversations, but also persistent chats and the like, one participant to a chat can select another participant to engage in the chat. The selection of a participant to engage in the chat involves the selection of a known participant from a pre-configured list of participants from previous chats, or the manual specification of the participant. For a manual specification of a participant, one generally must identify the network address of the participant—typically the e-mail address of the participant.

The manual specification of a participant for inclusion in a chat involves no validation—especially for a user residing outside of a community of chat participants. That is to say, the messaging system never determines whether the network address or other specified identity of an external participant is a valid network address. Mostly, messaging systems do not cooperate in validating the network address of a potential participant to a chat so as to avoid exposing the identities of valid users to would be malicious intruders and malfeasors. Consequently, to the user manually specifying a participant for a chat, the participant will always appear to be unavailable to engage in the chat. Additionally, any presence awareness associated with a validly specified participant will not apply in the case of an improperly specified participant.

BRIEF SUMMARY OF THE INVENTION

Embodiments of the present invention address deficiencies of the art in respect to validating a specified identity for a participant to a chat session and provide a novel and non-obvious method, system and computer program product for trusted contact name validation for an instant messaging session. In one embodiment of the invention, an instant messaging contact name validation method can be provided. The method can include establishing a trusted relationship among at least two instant messaging servers in a trusted community of instant messaging servers, receiving a request to add a specified contact to a list of instant messaging contacts in association within one of the instant messaging servers in the trusted community of instant messaging servers, and validating the specified contact with another of the instant messaging servers in the trusted community of instant messaging servers.

In another embodiment of the invention, an instant messaging data processing system can be provided. The system can include a set of instant messaging servers in a trusted community of instant messaging servers. The instant messaging servers in the trusted community can include an established trusted relationship with each other, such as an authenticated communicative coupling over which session initiation protocol (SIP) messages are exchanged. The system further can include trusted contact name validation logic coupled to each of the instant messaging servers. The trusted contact name validation logic can include program code enabled to receive a request to add a specified contact to a list of instant messaging contacts in association within one of the instant messaging servers in the trusted community of instant messaging servers, and to validate the specified contact with another of the instant messaging servers in the trusted community of instant messaging servers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for trusted contact name validation in an instant messaging system. In accordance with an embodiment of the present invention, a trust relationship can be established between a community of instant messaging servers. Thereafter, an instant messaging system user from within the community can add a new instant messaging contact to a contact list, for instance a buddy list. The instant messaging server authenticating the user can validate the contact with the community of instant messaging servers to ensure the validity of the contact name. In this way, the contact name will be assured to be valid, or the invalidity of the name can be made apparent to the user.

Figure 1:
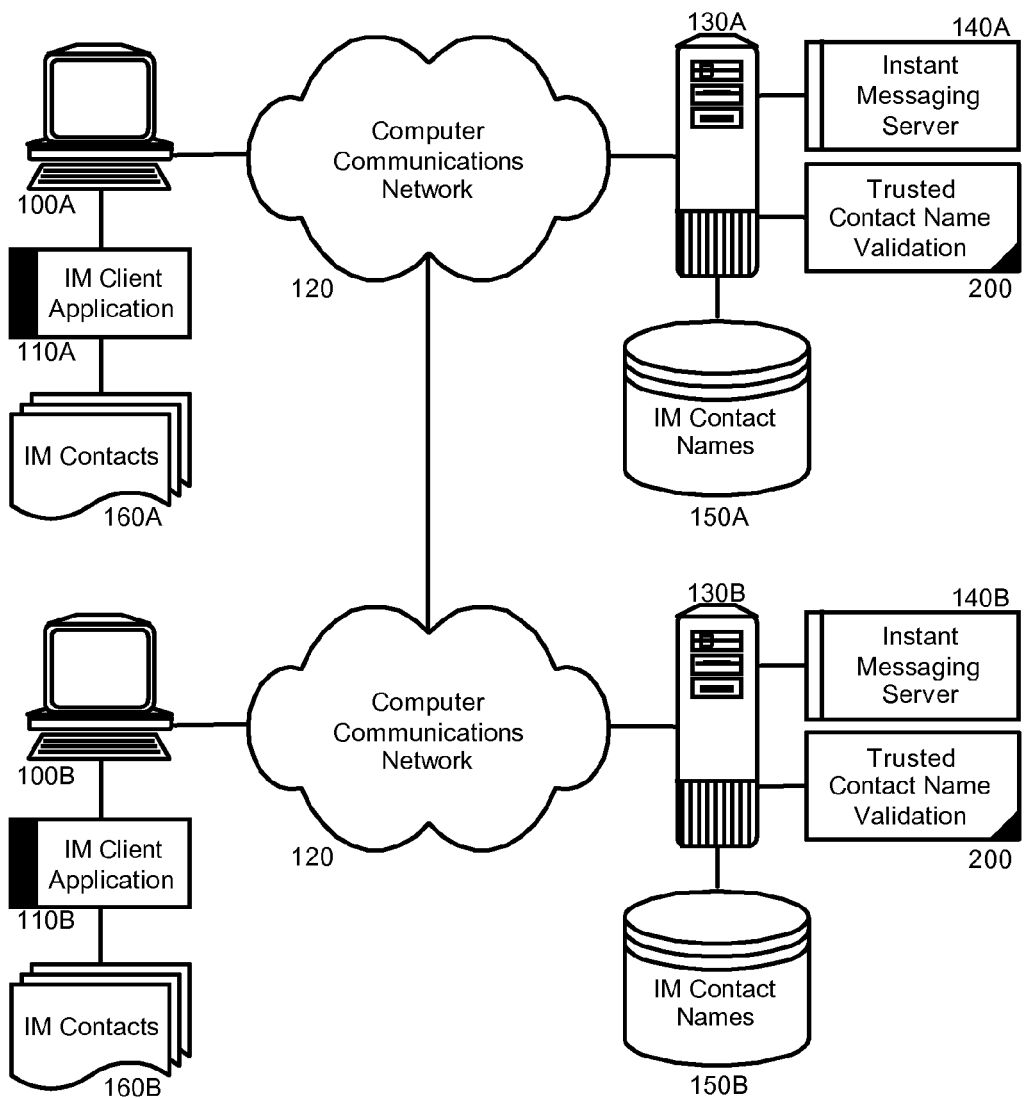
FIG. 1 is a schematic illustration of an instant messaging data processing system configured for trusted contact name validation; and, FIG. 2 is a flow chart illustrating a process for trusted contact name validation in an instant messaging system.

In further illustration, FIG. 1 is a schematic illustration of an instant messaging data processing system configured for trusted contact name validation. The system can include a host computing platform 130A supporting the operation of an instant messaging server 140A. The host computing platform 130A can be configured for coupling to one or more client computing systems 100A, each supporting the operation of an instant messaging client application 110A. (Only a client computing system and corresponding instant messaging client application shown for the purpose of illustrative simplicity). The instant messaging client application 110A can include a listing of one or more instant messaging contacts 160A, responsive to the selection of any of which an instant messaging thread of conversation can be established with the selected one of the instant messaging contacts 160A. Furthermore, the listing of one or more instant messaging contacts 160A can be a subset of the totality of instant messaging contact names 150A managed by the instant messaging server 140A.

The instant messaging server 140A can be included as part of a community of instant messaging servers coupled to one another within the same host computing platform 130A, or in different, remote host computing platforms 130B over the computer communications network 120. (Only a single, complimentary remote host computing platform is shown again for the sake of illustrative simplicity). For example, the instant messaging servers 140A, 140B in the trusted community can enjoy an authenticated communicative coupling over the computer communications network 120 over which SIP messages can be exchanged. Each remote host computing platform 130B can manage a set of participating instant messaging contact names 150B for coupled instant messaging client applications 110B in client computing systems 100B. Additionally, each of the instant messaging client applications 110B can include a list of instant messaging contacts 160B, for instance a buddy list.

Each of the instant messaging servers 140A, 140B in the community of instant messaging servers can include trusted contact name validation logic 200. The trusted contact name validation logic 200 can include program code enabled to validate a contact name, address or other identifier for an instant messaging contact. The program code of the trusted contact name validation logic 200, however, can be limited to validating contact names only on behalf of those instant messaging servers 140A, 140B in the community of instant messaging servers among which a trusted relationship has been established by way of an authentication process between servers.

In the present invention, once a trusted relationship has been established among the instant messaging servers 140A, 140B in the community of instant messaging servers, the program code of the trusted contact name validation logic 200 can validate requests to add new contact names or other such identifiers to the instant messaging contacts 160A with those names in the instant messaging contact names 150A for an associated instant messaging server 140A, or with those names in the instant messaging contact names 150B associated with a remote instant messaging server 140B in the community of instant messaging servers. Consequently, errors in the manual specification of a contact name in an instant messaging client application 110A, 110B can be avoided.

Figure 2:
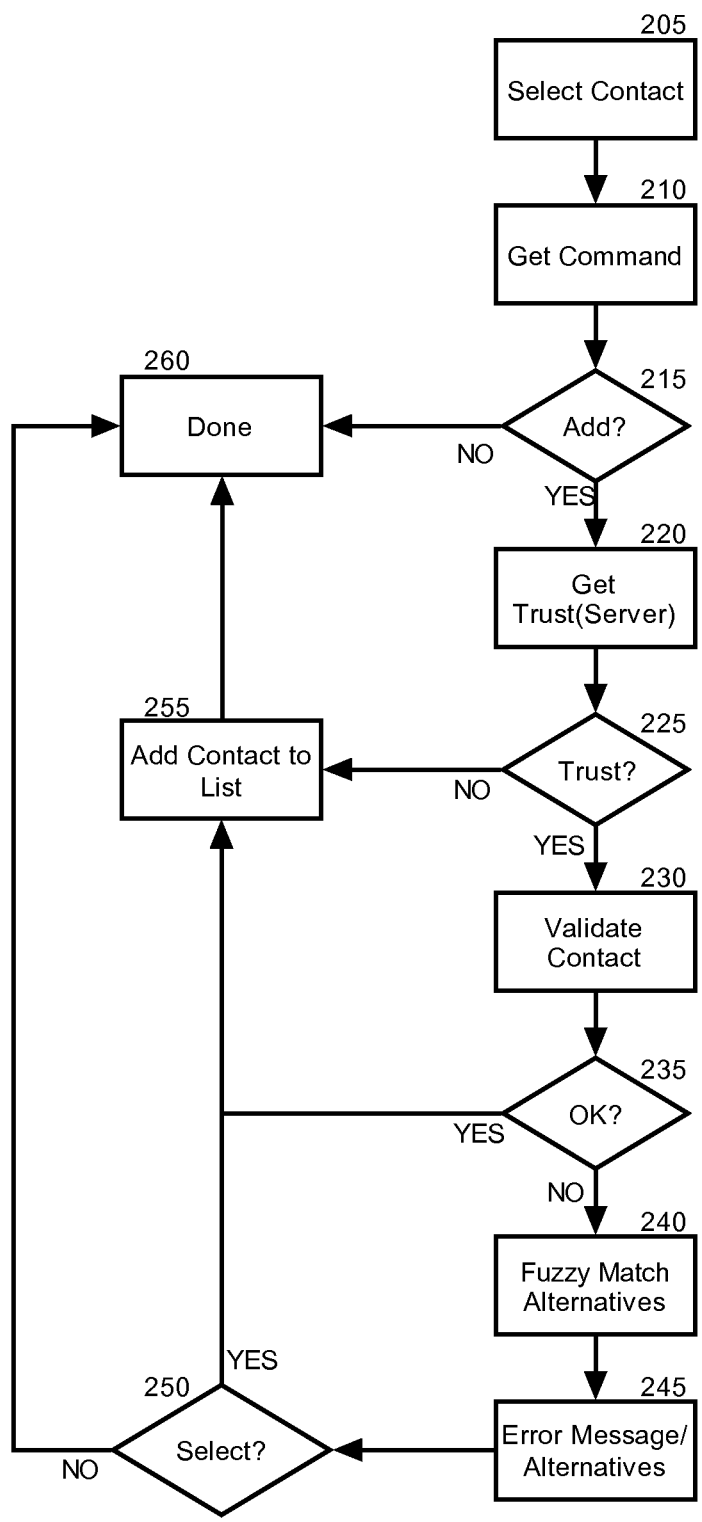

In yet further illustration, FIG. 2 is a flow chart illustrating a process for trusted contact name validation in an instant messaging system. Beginning in block 205, a contact can be specified in an instant messenger and in block 210, a command can be received in association with the specified contact. In decision block 215, if the command is an add command for adding the specified contact to a buddy list, in block 220 it can be determined whether the associated instant messaging server is trusted. In this regard, the associated instant messaging server can be deduced from the address of the specified contact.

In decision block 225, if it is determined that a trust relationship does not exist for the server associated with the specified contact, in block 255 the contact can be added to the buddy list irrespective of the validity of the specified contact and the process can end in block 260. Otherwise, if it is determined that a trust relationship does exist for the server associated with the specified contact, in block 230 the contact can be validated with the trusted server. Specifically, the instant messaging server supporting the user can compare the specified contact name or other identifier to known acceptable contact names or identifiers managed in the instant messaging server to determine whether the specified contact is invalid in consequence of which an error can be reported to the user.

Importantly, the specified contact name or other identifier also can be passed to other remote instant messaging servers in the community of trusted instant messaging servers to compare the specified contact name or other identifier to known acceptable contact names or identifiers managed in the other remote instant messaging servers. In this way, if invalid, the user can become aware of the invalidity of the contact name without unwittingly relying upon the invalid contact name. Conversely, the absence of an error reported during the addition of a contact name can add confidence by the user in the validity of the specified contact name. In either case, optionally, the invalid form of the specified contact name can be used to search for close matches and a listing of possible valid contact names can be returned to the user.

As such, the user can use the list of possible valid contact names to revise the specification of the contact name. In decision block 235, if the specified contact validates, the specified contact can be added to the buddy list in block 255. Otherwise, in block 240 a list of alternative contacts can be accumulated through fuzzy matching of the incorrectly specified contact. Thereafter, in block 245 an error message with the accumulated alternative contacts can be provided. In decision block 250, if an alternative contact is selected, in block 255 the selected contact can be added to the buddy list 255 and the process can end in block 260.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk —read only memory (CD-ROM), compact disk —read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An instant messaging contact name validation method comprising:
    establishing a trusted relationship among at least two instant messaging servers in a trusted community of instant messaging servers by establishing between the at least two instant messaging servers an authenticated communicative coupling over which session initiation protocol (SIP) messages are exchanged;
    receiving a request to add a specified contact to a list of instant messaging contacts in association within one of the at least two instant messaging servers in the trusted community of instant messaging servers; and,
    validating the specified contact with another of the at least two instant messaging servers in the trusted community of instant messaging servers only on behalf of ones of the instant messaging servers in the trusted community among which a trusted relationship has been established by way of the authenticated communicative coupling over which SIP messages are exchanged, the validating comprising passing the specified contact to the another of the at least two instant messaging servers, comparing the specified contact with a list of valid contacts managed in the another of the least two instant messaging servers, and matching the specified contact with the list of valid contacts managed in the another of the least two instant messaging servers.

2. The instant messaging contact name validation method of claim 1, wherein the instant messaging servers are chat servers.

3. The instant messaging contact name validation method of claim 1, wherein receiving the request to add the specified contact to the list of instant messaging contacts in association within the one of the at least two instant messaging servers in the trusted community of instant messaging servers, comprises receiving a request to add a specified contact name to the list of instant messaging contacts in association within the one of the at least two instant messaging servers in the trusted community of instant messaging servers.

4. The instant messaging contact name validation method of claim 3, wherein validating the specified contact with the another of the at least two instant messaging servers in the trusted community of instant messaging servers, further comprises validating the specified contact name with the another of the at least two instant messaging servers in the trusted community of instant messaging servers.

5. The instant messaging contact name validation method of claim 1, wherein validating the specified contact with the another of the at least two instant messaging servers in the trusted community of instant messaging servers, further comprises reporting the specified contact as invalid.

6. The instant messaging contact name validation method of claim 1, wherein validating the specified contact with the another of the at least two instant messaging servers in the trusted community of instant messaging servers, further comprises reporting the specified contact as invalid when the specified contact cannot be located among a list of valid contact names for the another of the at least two instant messaging servers.

7. The instant messaging contact name validation method of claim 1, wherein validating the specified contact with the another of the at least two instant messaging servers in the trusted community of instant messaging servers, further comprises reporting the specified contact as invalid and returning a listing of possible correct contacts to the one of the at least two instant messaging servers in the trusted community of instant messaging servers.

8. The instant messaging contact name validation method of claim 7, further comprising:
    determining that the specific contact is invalid;
    searching the list of valid contacts managed in the another of the at least two instant messaging servers using the specified contact found to be invalid according to fuzzy matching to locate possible correct contacts; and,
    creating the listing of possible correct contacts.

9. An instant messaging data processing system comprising:
    a plurality of instant messaging servers in a trusted community of instant messaging servers, the instant messaging servers in the trusted community comprising an established trusted relationship with each other using an authenticated communicative coupling over which session initiation protocol (SIP) messages are exchanged; and,
    trusted contact name validation logic coupled to each of the instant messaging servers, the trusted contact name validation logic comprising program code enabled to receive a request to add a specified contact to a list of instant messaging contacts in association within one of the instant messaging servers in the trusted community of instant messaging servers, and to validate the specified contact with another of the instant messaging servers in the trusted community of instant messaging servers only on behalf of ones of the instant messaging servers in the trusted community among which a trusted relationship has been established by way of the authenticated communicative coupling over which SIP messages are exchanged, the validating comprising passing the specified contact to the another of the instant messaging servers, comparing the specified contact with a list of valid contacts managed in the another of the instant messaging servers, and matching the specified contact with the list of valid contacts managed in the another of the instant messaging servers.

10. The instant messaging data processing system of claim 9, wherein the trusted contact name validation logic further comprises program code enabled to:
determine that the specific contact is invalid;
search the list of valid contacts managed in the another of the instant messaging servers using the specified contact found to be invalid according to fuzzy matching to locate possible correct contacts; and,
create a listing of possible correct contacts.

11. A computer program product comprising a non-transitory computer usable storage medium storing thereon computer usable program code for instant messaging contact name validation, the computer usable program code comprising a set of instructions which when executed by a machine cause the machine to perform:
establishing a trusted relationship among at least two instant messaging servers in a trusted community of instant messaging servers by establishing between the at least two instant messaging servers an authenticated communicative coupling over which session initiation protocol (SIP) messages are exchanged;
receiving a request to add a specified contact to a list of instant messaging contacts in association within one of the at least two instant messaging servers in the trusted community of instant messaging servers; and,
validating the specified contact with another of the at least two instant messaging servers in the trusted community of instant messaging servers only on behalf of ones of the instant messaging servers in the trusted community among which a trusted relationship has been established by way of the authenticated communicative coupling over which SIP messages are exchanged, the validating comprising passing the specified contact to the another of the at least two instant messaging servers, comparing the specified contact with a list of valid contacts managed in the another of the least two instant messaging servers, and matching the specified contact with the list of valid contacts managed in the another of the least two instant messaging servers.

12. The computer program product of claim 11, wherein the instant messaging servers are chat servers.

13. The computer program product of claim 11, wherein the receiving the request to add the specified contact to the list of instant messaging contacts in association within the one of the at least two instant messaging servers in the trusted community of instant messaging servers, comprises receiving a request to add a specified contact name to a list of instant messaging contacts in association within the one of the at least two instant messaging servers in the trusted community of instant messaging servers.

14. The computer program product of claim 13, wherein the validating the specified contact with the another of the at least two instant messaging servers in the trusted community of instant messaging servers, comprises validating the specified contact name with the another of the at least two instant messaging servers in the trusted community of instant messaging servers.

15. The computer program product of claim 11, wherein the validating the specified contact with the another of the at least two instant messaging servers in the trusted community of instant messaging servers, further comprises reporting the specified contact as invalid.

16. The computer program product of claim 11, wherein the validating the specified contact with the another of the at least two instant messaging servers in the trusted community of instant messaging servers, further comprises reporting the specified contact as invalid when the specified contact cannot be located among a list of valid contact names for the another of the at least two instant messaging servers.

17. The computer program product of claim 11, wherein the validating the specified contact with the another of the at least two instant messaging servers in the trusted community of instant messaging servers, further comprises reporting the specified contact as invalid and returning a listing of possible correct contacts to the one of the at least two instant messaging servers in the trusted community of instant messaging servers.

18. The computer program product of claim 17, wherein the computer usable program code comprising the set of instructions which when executed by the machine further causes the machine to perform:
determining that the specific contact is invalid;
searching the list of valid contacts managed in the another of the at least two instant messaging servers using the specified contact found to be invalid according to fuzzy matching to locate possible correct contacts; and,
creating the listing of possible correct contacts.

* * * * *